United States Patent [19]  [11] 4,405,141
Jurek  [45] Sep. 20, 1983

[54] SERVICING STEPS TO BE MOUNTED ON THE BUMPER OF A TRUCK

[76] Inventor: Leonard B. Jurek, 4206 - 2nd St., NE., Columbia Heights, Minn. 55421

[21] Appl. No.: 266,840

[22] Filed: May 26, 1981

[51] Int. Cl.³ .............................................. B60R 3/00
[52] U.S. Cl. ..................................... 280/163; 182/92; 182/120; 248/214; 293/117
[58] Field of Search ................................ 280/163–166, 280/291, 32.5; 182/92, 120, 121; 248/340, 214, 220.2; 296/75; 293/117; 242/42.03 A, 42.07

[56] References Cited

U.S. PATENT DOCUMENTS

| | | | |
|---|---|---|---|
| 3,159,242 | 12/1964 | Janes | 182/92 |
| 3,171,671 | 2/1965 | Cornett | 280/163 |
| 3,357,719 | 12/1967 | McCrea | 280/163 |
| 3,794,345 | 2/1974 | Locke | 280/163 |
| 3,980,319 | 9/1976 | Kirkpatrick | 280/166 |
| 4,056,270 | 11/1977 | Greenfield | 280/166 |
| 4,057,125 | 11/1977 | Kroft | 182/91 |
| 4,089,276 | 5/1978 | Enos | 182/92 |
| 4,102,432 | 7/1978 | Bustin | 182/92 |
| 4,159,122 | 6/1979 | Stevens | 280/166 |
| 4,191,388 | 3/1980 | Barksdale | 280/166 |
| 4,194,754 | 3/1980 | Hightower | 280/166 |
| 4,203,611 | 5/1980 | Makela | 280/163 |

Primary Examiner—David M. Mitchell
Assistant Examiner—Timothy Roesch
Attorney, Agent, or Firm—James V. Harmon

[57] ABSTRACT

A pair of separate stackable steps is described, one for supporting each foot of the user. Each step includes a sheet metal body that comprises a bumper engaging fulcrum section inclined upwardly proceeding towards its free edge and having a bumper engaging downwardly turned lip defining a hook at its free end adapted to slide over and engage the bumper, a downwardly extending center section and a horizontally extending platform section. The steps can be stacked closely together for storage.

9 Claims, 7 Drawing Figures

U.S. Patent    Sep. 20, 1983    4,405,141
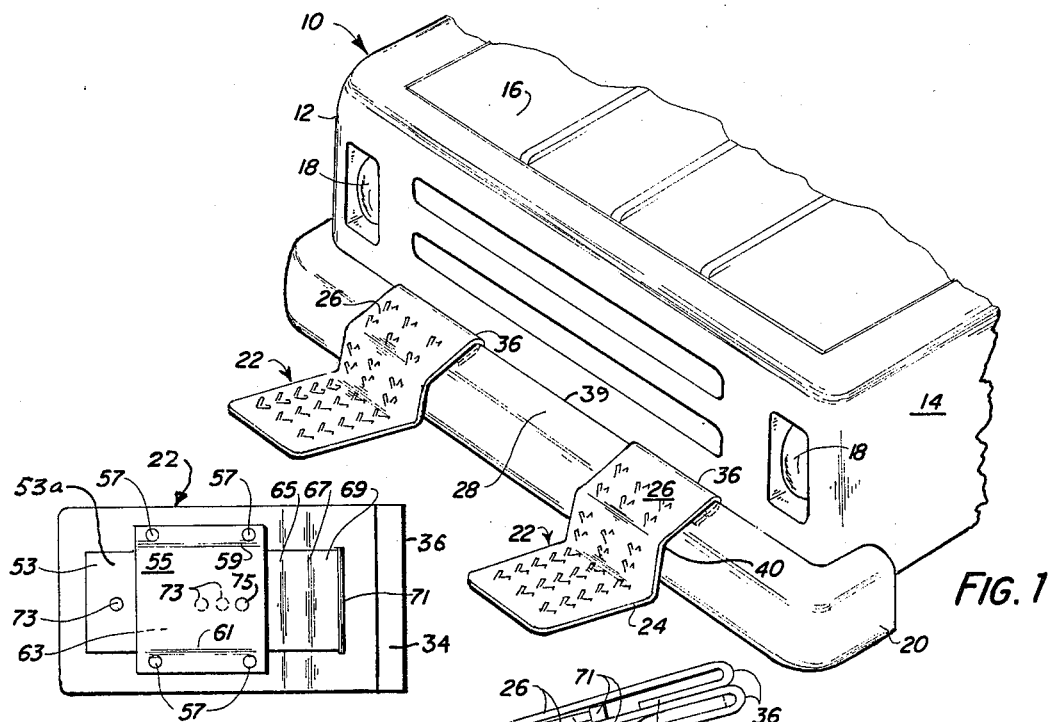
FIG. 1
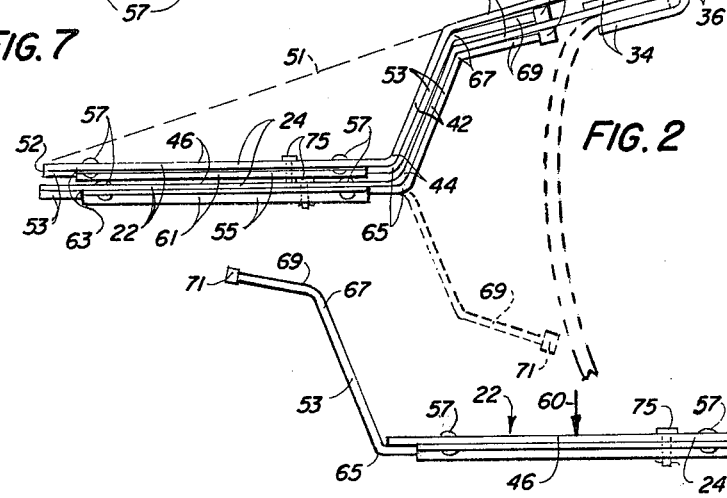
FIG. 7
FIG. 2
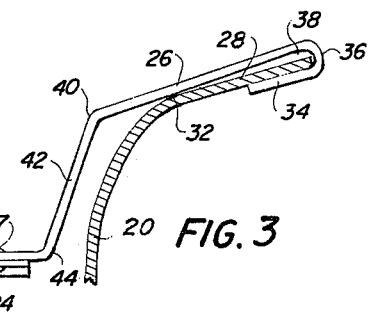
FIG. 3
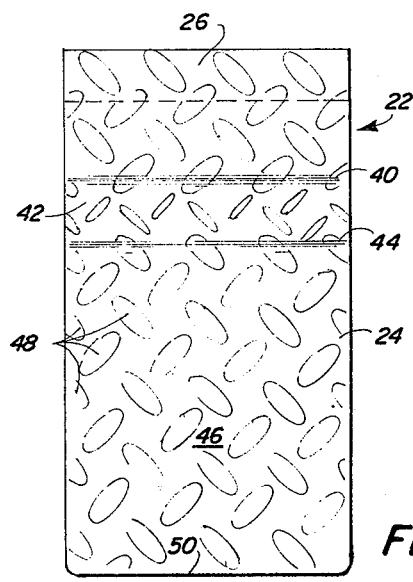
FIG. 4
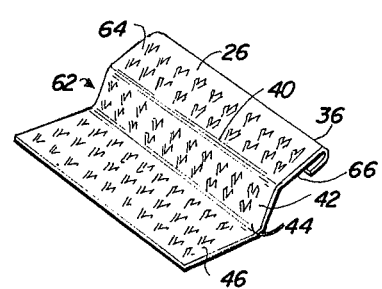
FIG. 5
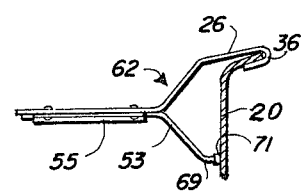
FIG. 6

SERVICING STEPS TO BE MOUNTED ON THE BUMPER OF A TRUCK

FIELD OF THE INVENTION

This invention relates to portable equipment for servicing vehicles and more particularly to steps that can be mounted on the bumper to support a person performing service work when required.

THE PRIOR ART

One of the most serious difficulties encountered in servicing trucks such as pickup trucks is the problem of getting up high enough on the vehicle to have adequate access to the engine and associated equipment. Some resort to kneeling on the grill of the vehicle. This is uncomfortable and can be dangerous. As a result, a number of devices have been previously proposed for gaining access to the vehicle. For example, U.S. Pat. No. 4,194,754 describes a folding step to be mounted on the front bumper of a pickup truck. While this will adequately support a person, it occupies a good deal of space ahead of the grill in a location that will change the appearance of the vehicle and consequently will be unsatisfactory for some prospective users. The unit also has to be bolted permanently to the vehicle.

U.S. Pat. No. 4,057,125 describes a truck servicing platform of very large size. It is unsuited for being stored on the vehicle itself, a primary objective of the present invention, and includes numerous parts such as hinges which make it expensive to manufacture. The large size and bulk make it relatively more difficult to store.

U.S. Pat. No. 4,102,432 describes a step mounting structure for a vehicle tank such as a gas tank mounted on the frame of the truck slightly to the rear of the cab. Here again, mounting is achieved by bolts and the unit can get in the way when not in use. Its large size and bulk make it difficult to store.

U.S. Pat. No. 4,159,122 describes another bumper mounted folding step for a vehicle. This unit also must be bolted permanently in place and interferes with a clean visual appearance of the vehicle. This is objectionable to some truck owners.

U.S. Pat. No. 3,159,242 describes a detachable bumper step comprising a platform. The step is mounted by means of hooks but the hooks must be tightened with a wrench each time the step is used. This is inconvenient and time consuming.

OJBECTS

In view of these and other shortcomings of the prior art, it is an objective of the present invention to provide an extremely low cost step which can be formed from coated or uncoated sheet metal or metal plate and has the following characteristics and advantages:

(a) The step is secure when in place and is strong enough to hold the weight of a man.

(b) The steps when used in pairs are stackable and can be fitted closely together for storage, e.g. under the seat of the vehicle so that they can be considered portable.

(c) The steps are capable of being mounted and demounted in only a few seconds and yet will securely support the user.

(d) The steps are self locking when in place in such a way that the weight of the user holds the steps stationary during the period of use.

(e) The step units can be made in various sizes as for example a small size adapted to support the weight of one foot or a large size for supporting both feet.

(f) The step in accordance with the invention will fit most bumpers.

(g) The step includes a shoulder that automatically helps to prevent the step from being dislodged once it is put in place and assists in directing the force applied by the weight of the user in such a manner as to reliably bind the step in place.

(h) Steps are low in cost and adapted to be made from a single piece of metal plate.

(i) Each step may include a supporting brace adapted to engage the lower portion of the bumper for added stability.

SUMMARY OF THE INVENTION

The invention provides a servicing step to be mounted on the bumper of a truck. The steps can be used singly or in pairs when the steps are relatively small in size. The pair of steps in accordance with the invention are stackable when stored. Each step is adapted to support one foot of the user. The steps include a body portion having a bumper engaging fulcrum section preferably inclined upwardly proceeding toward its free edge and including a bumper engaging downwardly turned lip defining a hook at its free edge. The center section extends downwardly from the other edge of the fulcrum section and a platform section extends horizontally from the bottom edge of the center section. In this way the invention provides a quick mounting servicing step to be supported on the bumper of the truck whenever servicing is required. The bumper engaging hook is fixed with respect to the step and is preferably formed integrally with it, e.g. by turning down the forward edge of the fulcrum section to form a lip spaced from the fulcrum section itself. Both the fulcrum section and the platform section are preferably formed from flat sheets or plates and are rigidly associated together. During use the weight of the user is applied to the platform section. The step body acts as a lever arm with a fulcrum defined between the fulcrum section and the bumper. The step body tends to pivot in such a direction that the hook is forced upwardly thereby jamming the hook into binding engagement with the bumper. In this way the step stays securely in place during use but can be quickly mounted and demounted by raising the platform section and sliding the step rearwardly to disengage the hook from the bumper.

THE FIGURES

FIG. 1 is a perspective view of the front end of a pickup truck showing two steps mounted in position on the bumper ready for use.

FIG. 2 is a side elevational view of two steps on a larger scale in stacked condition ready for storage.

FIG. 3 is a side elevational view of a step engaged on a bumper.

FIG. 4 is a plan view of one of the steps of FIG. 1.

FIG. 5 is a perspective view of a modified form of the invention.

FIG. 6 is a side elevational view of the step of FIG. 5 when engaged on the bumper of the truck and FIG. 7 is a bottom view of the step of FIGS. 1-4.

Refer now to the Figures. Shown in FIG. 1 is the front end 10 of a truck body including the usual fenders 12 and 14, hood 16, headlights 18, and front bumper 20.

When the hood 16 is raised for servicing it is very difficult to gain adequate access to the engine and associated equipment by standing on the ground. To alleviate this problem the present invention provides a quick mounting, self locking servicing step 22 to be supported on the truck bumper 20. Two steps 22 are shown in FIG. 1, each of which is preferably of the proper size so that one foot can be supported on each.

The steps 22 will now be described in detail by reference to FIGS. 1 through 4.

Each step 22 comprises a step body 24 that is preferably but not necessarily formed from sheet metal or metal plate. While the step body 24 can be built up from pieces welded or otherwise bonded together it preferably consists of a single integral piece of material to provide a unitary construction, the most preferred material comprising sheet metal or metal plate formed with a series of bends as will be described below. One excellent material is 3/16" thick non-skid metal plate. The step body includes a fulcrum plate section 26 adapted to engage the upper surface 28 of bumper 20. Specifically the fulcrum plate engages the surface 28 of bumper 20 at a fulcrum point 32 which is clearly shown in FIG. 3. At the free end of the fulcrum plate section 26 is a downwardly bent rectangular lip 34 defining the hook 36 including a slot 38 between the parallel walls 26 and lip 34 that is wide enough to slide easily over the rearward edge 39 of the bumper 30. It will thus be understood that the hook 36 is fixed, i.e. immovable with respect to the step body and is in this instance integral therewith.

The fulcrum plate section 26 is inclined upwardly proceeding toward the rear of the vehicle at a significant angle generally about 20° or 30° with respect to the horizontal. This enables the step to fit most vehicles. At the opposite edge of the plate section 26 is a transverse bend 40 that extends all the way across the step body. From bend 40 the step body extends downwardly. This section of the step body comprises a downwardly extending center section 42. The intersection between the fulcrum plate section 26 and the center section 42 at bend 40 comprises a shoulder which helps to keep the step in place once mounted. For example, if the step is engaged as shown on the bumper and is accidentally moved rearwardly, the shoulder and the center section 42 will be likely to engage the bumper 20 and prevent the steps from accidentally falling off. The shoulder and center section 42 also help to apply the weight of the user in a manner that will lock the step in place as will be described below.

At the lower edge of the center section 42 is another transverse bend 44. From that point the step body extends horizontally. This horizontal portion comprises a platform section 46 upon which the user stands when the step is in use. At least the platform section 46 is preferably provided with a non-skid surface, e.g. by the use of non-skid projections 48. This can be accomplished simply by stamping the step from a piece of non-skid steel plate which is readily available commercially. To further reduce slippage, the plate can also be painted with a non-skid coating such as a product called X-97 Black Surefoot or other suitable non-skid coating or, if desired, covered with a layer of a non-skid sheet material having granules bonded therein such as a non-skid sheet manufactured by Minnesota Mining and Manufacturing Company of St. Paul, Minn. It will be noted by reference to FIG. 2 that the fulcrum plate 26 lies in a plate 51 indicated by a dotted line which intersects the free or forwardmost edge 52 of the platform section 46. Thus, when viewed in this manner, the step comprises a fulcrum plate with rigidly associated platform and center sections that are deflected downwardly out of the plane of the fulcrum plate. The steps are preferably made in the proper size to be used as a pair in the manner shown in FIG. 1 with one foot resting on each. An important advantage of the invention is that the steps when removed can be readily stored stacked closely together as shown in FIG. 2. Thus, when the steps are to be placed in storage they are put one on top of the other as shown in FIG. 2 and kept in the vehicle, for example, under or behind the seat and accordingly they can be considered portable.

Slidably mounted beneath the step body 22 is an optional brace 53 formed from metal plate and having a step body engaging section 53a adapted to be moved manually when desired toward or away from the hook 36 within a sheath 55 which itself is secured to the step 22 in any suitable manner as by bolts 57. The sheath 55 includes two laterally spaced apart parallel bends 59 and 61 defining a slot 63 open at both ends in which the brace is loosely held. The brace 53 includes two transverse parallel laterally extending bends 65 and 67 that form an upwardly extending foot section 69 which conforms exactly to the contour of the step 22 for storage as shown in solid lines in FIG. 2. However, when withdrawn and inverted as shown in dotted lines the foot section 69 (after retaining pin 75 has been removed and reinserted in any selected one of holes 73) is in an operating position and will engage the bumper 20 only when the user stands on the step 22 deflecting the step and brace downwardly. The selectively adjustable retaining means comprising the pin 75 and holes 73 allows selective positioning of the brace on axis 49. To avoid scratching the bumper 20, the extreme end of the foot 69 is covered with rubber or plastic at 71. If not needed as for example in most Ford or Chevrolet trucks, (FIG. 3) the brace 53 is removed and reinserted with the foot 69 extending upwardly from the outer (free) end of the step 22 to serve as a foot guard. During use, as shown in FIG. 2, the free end 71 will be spaced from the bumper 20 until weight is applied. In this way the brace 53 prevents excessive bending of the step or twisting of the bumper 20. The holes 73 allow adjustable positioning of the brace relative to the bumper 20.

The operation of the step will now be described by reference to FIGS. 1 and 3. When the steps are to be used they are taken from storage and the hook 36 is engaged over the rearward edge 40 of the bumper 20 and slid forwardly until the rear edge of the bumper engages the closed end of the hook. The platform section 46 is then lowered until the fulcrum plate 26 engages the bumper at fulcrum point 32. When the user stands on the step the weight of the user indicated by arrow 60 applies a force causing the step to act as a lever arm pivoting about fulcrum point 32 and thereby raising the hook 36, i.e. forcing it upwardly and thereby jamming the hook into binding engagement with the bumper 30. This causes the step to stay securely in position during use. At this time, however, the steps can be quickly mounted and later demounted in a matter of seconds by raising the platform section and sliding the step rearwardly to disengage the hook 36 from the bumper 20. In this way, the steps can be thought of as self locking and portable.

Refer now to FIGS. 5 and 6 which illustrate another embodiment of the invention designated by the numeral 62 wherein the same numerals are used to designate the same parts illustrated in FIGS. 1 through 4. The construction of the step is just as described in FIGS. 1 through 4 except that the step 62 is much wider from side to side and can be, for example, about 1½ to 2 feet wide from the side edge 64 to the opposite side edge 66 so that only one step is used at a time with the user standing on the platform portion 46 with both feet. This embodiment is especially useful for a non-portable application, for example, a step unit that is to be used primarily in a servicing garage in which case the step 62 is stored in the garage itself and is not carried in the vehicle. Because of the large size of the step 62, the auxiliary support provided by the brace 53 is very helpful (FIG. 6). The embodiment 62 is used in the same manner as described above. The weight of the user can be used to help securely retain the step 62 in place on the bumper 20. However, to prevent undue deflection of the platform section 46 or bending of the bumper, the brace 53 will engage the bumper 20 after the user mounts the platform.

It is apparent that many modifications and variations of this invention as hereinbefore set forth may be made without departing from the spirit and scope thereof. The specific embodiments described above are given by way of example only and the invention is limited only by the terms of the appended claims.

What is claimed is:

1. A quick mounting servicing step to be supported on the bumper of a truck that requires servicing comprising a step body including a fulcrum plate section adapted to rest during use against the upper surface of the bumper and having a fixed bumper engaging hook on its free edge, a platform section rigidly associated with the fulcrum section, said platform section comprising a support surface positioned horizontally and when mounted on the bumper extending outwardly from the bumper and away from the truck, whereby the weight of a user applied to the platform section causes the step to act as a lever arm having a fulcrum point defined between the fulcrum section and the bumper, the step body tending to pivot about the fulcrum point such that the hook is forced upwardly and is thereby jammed into binding engagement with the bumper whereby the step will stay securely in place during use but can be quickly mounted and later demounted by raising the platform section and sliding the step toward the truck to disengage the hook from the bumper, the step is formed from an integral metal plate including three transverse bends comprising a first bend at the free edge of the fulcrum plate section wherein a lip is bent downwardly and includes a portion parallel to the fulcrum plate section and spaced therefrom to define a bumper engaging slot, a second transverse bend parallel to the first bend wherein the step bends downwardly from the fulcrum plate section to define a shoulder between the fulcrum plate section and a center section and a third transverse bend in the opposite direction from the second bend from which the sheet material extends horizontally to define the platform section upon which the user stands during use.

2. The step of claim 1 wherein at least the platform section has a non-skid upper surface to prevent slippage of the user thereon.

3. The step of claim 1 wherein said steps are used in pairs and each of said steps is formed from flat sheet material having said parallel transverse bends therein whereby said steps can be stacked closely together for storage.

4. The step of claim 1 wherein a supporting brace is secured to the platform section to help support the same from the bumper, said brace extending downwardly therefrom and engaging the bumper at its lower end.

5. The step of claim 4 wherein the brace is removably mounted on the step body.

6. The step of claim 1 wherein the fulcrum plate section is located in a fixed inclined plate and the platform section and center section are deflected downwardly with respect thereto out of said fixed plane.

7. The step of claim 6 wherein the step is formed from a sheet of non-skid metal plate having frictional projections extending upwardly from the upper surface thereof.

8. A quick mounting servicing step to be supported on the bumper of a truck that requires servicing comprising a step body including a fulcrum plate section adapted to rest during use against the upper surface of the bumper and having a bumper engaging hook on its free edge, a platform section rigidly associated with the fulcrum section, said platform section comprising a support surface positioned horizontally and when mounted on the bumper extending outwardly from the bumper away from the truck whereby the weight of a user applied to the platform section causes the step body to act as a lever arm having a fulcrum point such that the hook is forced upwardly and is thereby jammed into binding engagement with the bumper whereby the step will stay securely in place during use but can be quickly mounted and later demounted by raising the platform section and sliding the step toward the truck to disengage the hook from the bumper, said platform section and fulcrum plate section lie in intersecting planes whereby the step has a predetermined contour, a member is connected to the lower surface of the step to provide a sheath between the step and the member to receive a brace number, said brace member has a bumper engaging foot at one end adapted to contact the bumper and help support the step after the user mounts the step; said brace being bent upwardly at one end to define said foot and the foot end of the brace conforms to said contour of the step when the brace is in a storage position within the sheath and said brace is removeable so that it can be inverted and reinserted into the sheath to assume an operating position.

9. The step of claim 8 wherein the brace is slidable in said sheath on an axis extending toward and away from the bumper and a selectively adjustable retaining means is provided to allow selective positioning of said brace on said axis.

* * * * *